(12) United States Patent
Cha et al.

(10) Patent No.: US 12,154,722 B2
(45) Date of Patent: Nov. 26, 2024

(54) CAPACITOR COMPONENT

(71) Applicant: SAMSUNG ELECTRO-MECHANICS CO., LTD., Suwon-si (KR)

(72) Inventors: Jin Uk Cha, Suwon-si (KR); Chang Min Lee, Suwon-si (KR); Hye Sung Yoon, Suwon-si (KR); Seon A Jang, Suwon-si (KR); Ji Hyuk Lim, Suwon-si (KR); Ki Yong Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/404,239

(22) Filed: Jan. 4, 2024

(65) Prior Publication Data

US 2024/0145171 A1 May 2, 2024

Related U.S. Application Data

(63) Continuation of application No. 17/704,411, filed on Mar. 25, 2022.

(30) Foreign Application Priority Data

Nov. 11, 2021 (KR) .................. 10-2021-0154819

(51) Int. Cl.
*H01G 4/12* (2006.01)
*H01G 4/012* (2006.01)
(Continued)

(52) U.S. Cl.
CPC ......... *H01G 4/1227* (2013.01); *H01G 4/2325* (2013.01); *H01G 4/30* (2013.01); *H01G 4/012* (2013.01)

(58) Field of Classification Search
CPC ............ H01G 4/30; H01G 4/02; H01G 4/008; H01G 4/1218; H01G 4/012; H01G 4/1227; H01G 4/33; H01G 4/2325
See application file for complete search history.

(56) References Cited

U.S. PATENT DOCUMENTS 9,859,058 B2 * 1/2018 Hong ................... H01G 4/30
10,366,834 B1 * 7/2019 Lee .................... H01G 4/012
(Continued)

FOREIGN PATENT DOCUMENTS

JP         2019-096824 A    6/2019
KR    10-2019-0121139 A   10/2019
KR    10-2021-0071496 A    6/2021

OTHER PUBLICATIONS

U.S. Notice of Allowance dated Oct. 6, 2023 issued in U.S. Appl. No. 17/704,411.
(Continued)

*Primary Examiner* — Michael P McFadden
(74) *Attorney, Agent, or Firm* — Morgan, Lewis & Bockius LLP

(57) ABSTRACT

A capacitor component includes a body including a dielectric layer and first and second internal electrode layers, and external electrodes disposed on the body and connected to the first and second internal electrode layers, respectively. The body includes an active portion in which the first and second internal electrode layers are alternately disposed with the dielectric layer interposed therebetween, a cover portion disposed on an upper portion and a lower portion of the active portion, and a side margin portion disposed on both sides of the active portion opposing each other. When a content of magnesium (Mg) included in the active portion is A1, a content of magnesium (Mg) included in the cover portion is C1, and a content of magnesium (Mg) included in
(Continued)

the margin portion is M1, 0<A1<M1≤C1 and A1/C1≤0.60 are satisfied.

16 Claims, 4 Drawing Sheets

(51) Int. Cl.
*H01G 4/232* (2006.01)
*H01G 4/30* (2006.01)

(56) References Cited

U.S. PATENT DOCUMENTS

| | | |
|---|---|---|
| 11,901,128 B2* | 2/2024 | Cha .......................... H01G 4/30 |
| 2011/0051315 A1* | 3/2011 | Dogan ................ C04B 35/4682 |
| | | 361/321.1 |
| 2015/0036264 A1* | 2/2015 | Morita ................ C04B 35/4682 |
| | | 361/321.4 |
| 2016/0196918 A1* | 7/2016 | Hong ..................... H01G 4/232 |
| | | 361/301.4 |
| 2018/0061575 A1* | 3/2018 | Mizuno .................... H01G 4/30 |
| 2018/0182555 A1* | 6/2018 | Kowase ................... H01G 4/30 |
| 2018/0261390 A1* | 9/2018 | Sakate ..................... H01G 4/30 |
| 2018/0294097 A1* | 10/2018 | Ono ......................... H01G 4/12 |
| 2020/0051739 A1* | 2/2020 | Park ......................... H01G 4/30 |
| 2020/0051741 A1* | 2/2020 | Park ......................... H01G 4/30 |
| 2021/0175016 A1 | 6/2021 | Yun et al. |

OTHER PUBLICATIONS

U.S. Office Action dated Jun. 28, 2023 issued in U.S. Appl. No. 17/704,411.

\* cited by examiner

CAPACITOR COMPONENT

CROSS-REFERENCE TO RELATED APPLICATION(S)

This application is a continuation of U.S. patent application Ser. No. 17/704,411, filed on Mar. 25, 2022 which claims benefit of Korean Patent Application No. 10-2021-0154819 filed on Nov. 11, 2021, the entire disclosures of which are incorporated herein by reference for all purposes.

TECHNICAL FIELD

The present disclosure relates to a capacitor component.

BACKGROUND

MLCCs, capacitor components, are important chip components used in industries such as the communications, computing, home appliance, and automobile industries due to small size, high capacity, and ease thereof in mounting, and in detail, are key passive elements used in various electric, electronic and information communication devices such as mobile phones, computers, and digital TVs.

In accordance with the demand for higher performance of an MLCC, the dielectric layer is getting thinner. However, when the dielectric layer is thinned, the capacity may be improved, but for example, the thicknesses of the cover portion and the margin portion are also reduced, which may cause a problem in that moisture resistance reliability is reduced.

SUMMARY

This summary is provided to introduce a selection of concepts in simplified form that are further described below in the Detailed Description. This summary is not intended to identify key features or essential features of the claimed subject matter, nor is it intended to be used as an aid in determining the scope of the claimed subject matter.

An aspect of the present disclosure is to provide a capacitor component having improved reliability.

According to an aspect of the present disclosure, a capacitor component includes a body including a dielectric layer and first and second internal electrode layers; and external electrodes disposed on the body and connected to the first and second internal electrode layers, respectively. The body includes an active portion in which the first and second internal electrode layers are alternately disposed with the dielectric layer interposed therebetween, a cover portion disposed on an upper portion and a lower portion of the active portion, and a side margin portion disposed on both sides of the active portion opposing each other. When a content of magnesium (Mg) included in the active portion is A1, a content of magnesium (Mg) included in the cover portion is C1, and a content of magnesium (Mg) included in the margin portion is M1, $0<A1<M1 \leq C1$ and $A1/C1 \leq 0.60$ are satisfied.

According to an aspect of the present disclosure, a capacitor component includes a body including a dielectric layer and first and second internal electrode layers; and external electrodes disposed on the body and connected to the first and second internal electrode layers, respectively. The body includes an active portion in which the first and second internal electrode layers are alternately disposed with the dielectric layer interposed therebetween, a cover portion disposed on an upper portion and a lower portion of the active portion, and a side margin portion disposed on opposing sides of the active portion. When a content of magnesium (Mg) included in the active portion is A1, a content of magnesium (Mg) included in the cover portion is C1, and a content of magnesium (Mg) included in the side margin portion is M1, $0<A1<M1 \leq C1$ is satisfied. When a porosity of the active portion is A2 and a porosity of the cover portion is C2, $A2/C2 \geq 0.003$ is satisfied.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
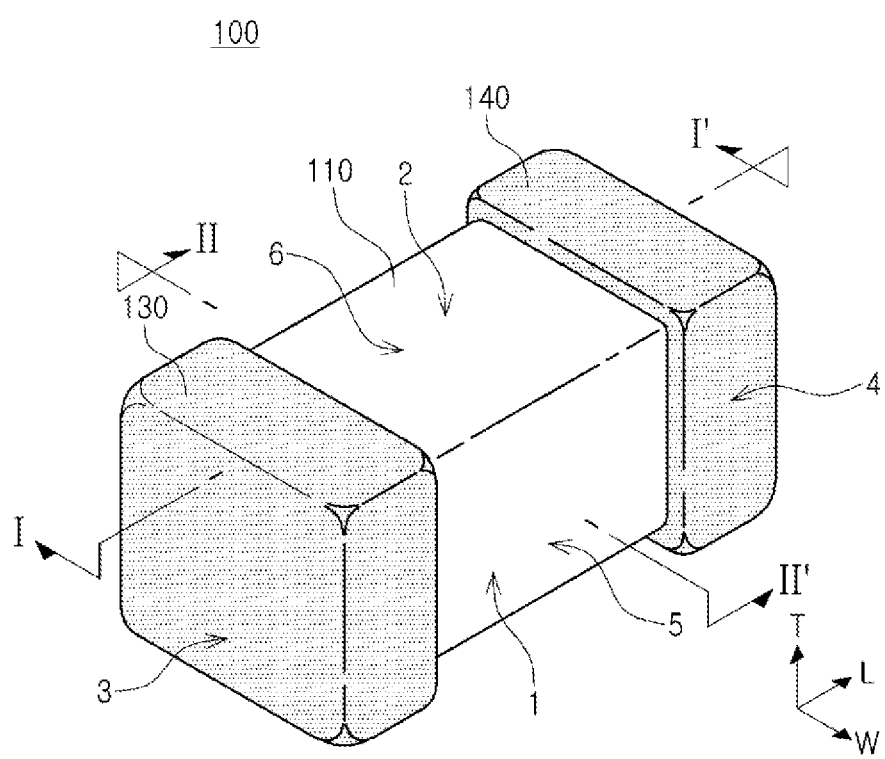
FIG. 1 is a view schematically illustrating a capacitor component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depictions of elements in the drawings may be exaggerated for purposes of clarity, illustration, and convenience.

Figure 2:
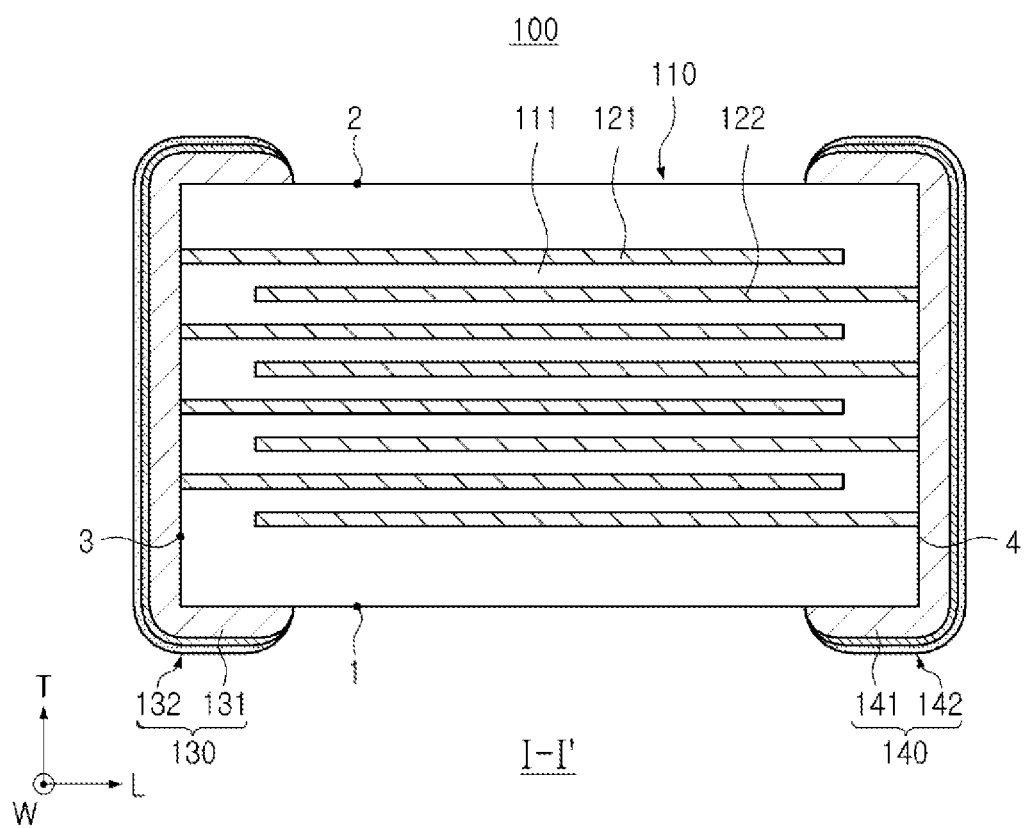
FIG. 2 is a view schematically illustrating a cross section taken along line I-I' of FIG. 1.
Figure 3:
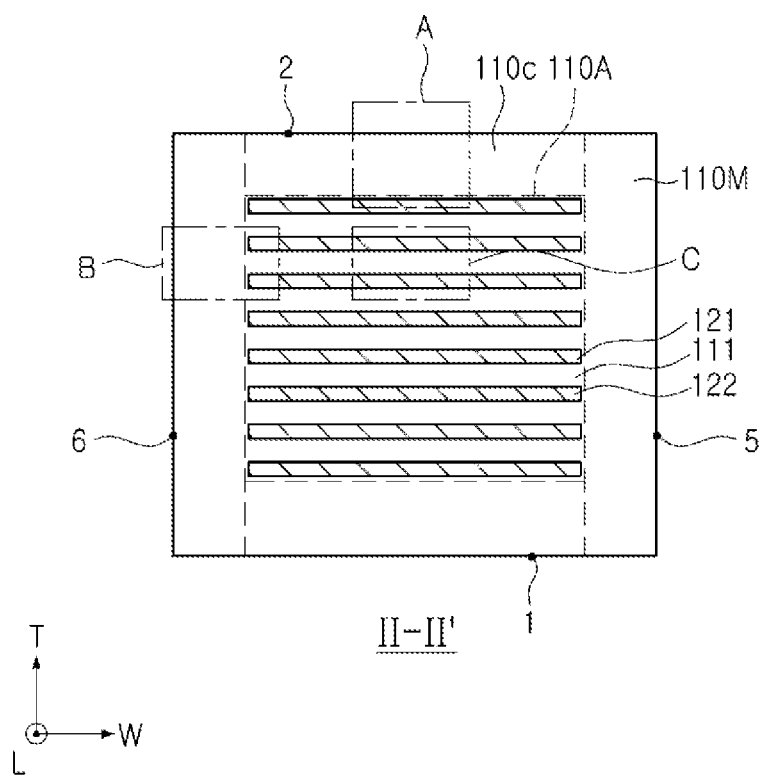
FIG. 3 is a view schematically illustrating a cross section taken along line II-II' of FIG. 1.

FIG. 1 is a diagram schematically illustrating a capacitor component according to an embodiment. FIG. 2 is a diagram schematically illustrating a cross-section taken along line I-I' of FIG. 1. FIG. 3 is a view schematically illustrating a cross section taken along line II-II' of FIG. 1.

Referring to FIGS. 1 to 3, a capacitor component 100 according to an embodiment includes a body 110 and first and second external electrodes 130 and 140.

In an embodiment, the body 110 is not particularly limited in terms of shape, but may have a substantially hexahedral shape. For example, the body 110 may not have a perfect hexahedral shape, but may have a substantially hexahedral shape due to a difference in thickness according to the arrangement of internal electrode layers 121 and 122 and polishing of the corners.

When the direction of the hexahedron is defined in order to clearly describe the embodiment, L, W, and T indicated in the drawings indicate the longitudinal direction, the width direction, and the thickness direction, respectively. In this case, the thickness direction may be used as the same concept as the stacking direction in which the dielectric layers are stacked.

In addition, in the body 110, both surfaces opposing each other in the T direction are defined as first and second surfaces 1 and 2, both surfaces connected to the first and second surfaces 1 and 2 and opposing each other in the L direction are defined as the third and fourth surfaces 3 and 4, and both surfaces connected to the first and second surfaces 1 and 2, connected to the third and fourth surfaces 3 and 4 and opposing each other in the W direction are defined as fifth and sixth surfaces 5 and 6. In this case, the first surface 1 may be a mounting surface.

The body 110 may include an active portion 110A serving as a part contributing to capacity formation of the capacitor, a cover portion 110C formed on upper and lower portions of the active portion 110A, respectively, and a margin portion 110M disposed on both side portions of the active portion 110A opposing in the width direction.

The active portion 110A may have a structure in which a plurality of dielectric layers 111 and a plurality of first and second internal electrode layers 121 and 122 are alternately stacked with the dielectric layer 111 interposed therebetween.

The dielectric layer 111 may be formed using a ceramic powder having a high dielectric constant, for example, a barium titanate ($BaTiO_3$)-based or strontium titanate ($SrTiO_3$)-based powder, but the present disclosure is not limited thereto. In this case, for example, that the dielectric layer 111 is formed using barium titanate ($BaTiO_3$)-based powder may indicate that barium titanate ($BaTiO_3$) powder is used as a main component, and subcomponent powder is added to the main component. The subcomponent may include a compound (referring to oxide, nitride, and the like) containing cations of elements capable of substituting or interstitial for lattice positions of barium (Ba) and/or titanium (Ti), i.e., an A-site and/or a B-site may be included, in the perovskite structure ($ABO_3$) of barium titanate ($BaTiO_3$). On the other hand, as will be described later, the dielectric layer 111 includes magnesium (Mg).

The first and second internal electrode layers 121 and 122 may be disposed to face each other with the dielectric layer 111 interposed therebetween.

The first and second internal electrode layers 121 and 122 may be formed by printing a conductive paste containing a conductive metal to a predetermined thickness on a dielectric green sheet for formation of the dielectric layer 111, to be laminated with the dielectric green sheet interposed therebetween in the lamination direction of the dielectric green sheets, resulting in forming a laminate, and by sintering the laminate. The first and second internal electrode layers 121 and 122 may be formed to be alternately exposed through the third and fourth surfaces 3 and 4 of the body 110 formed by sintering the laminate, and may be electrically insulated from each other by the dielectric layer 111 interposed therebetween.

The first and second internal electrode layers 121 and 122 and may be electrically connected to first and second external electrodes 130 and 140 through portions thereof alternately exposed through the third and fourth surfaces 3 and 4 of the body 110, respectively.

Accordingly, when a voltage is applied to the first and second external electrodes 130 and 140, electric charges are accumulated between the first and second internal electrode layers 121 and 122 facing each other, and at this time, the capacitance of the capacitor component 100 is proportional to the area of the overlapping regions of the first and second internal electrode layers 121 and 122.

Figure 4:
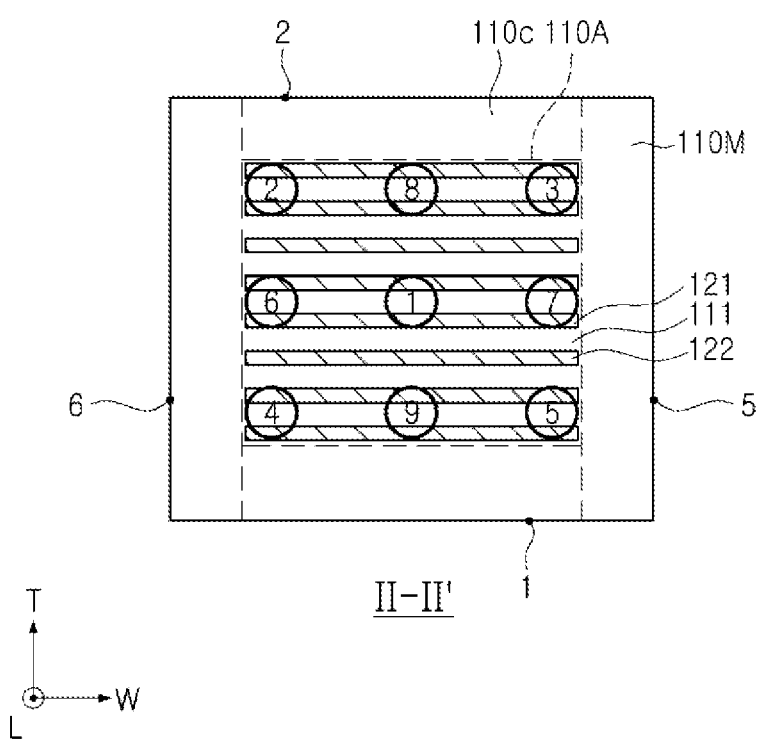
FIG. 4 is a view schematically illustrating the division of an active portion, divided into nine regions in a cross section taken along line II-II' of FIG. 1, to measure a thickness of each of a dielectric layer and an internal electrode layer.

The average thickness of each of the dielectric layer 111 and the internal electrode layers 121 and 122 may be 400 nm or less. Since the average thickness of each of the dielectric layer 111 and the internal electrode layers 121 and 122 is 400 nm or less, it may be advantageous to reduce the thickness of the capacitor component 100 according to the present embodiment. In this case, the average thickness of the dielectric layer 111 indicates that the active portion 110A illustrated on the W-T cross section of the body 100 taken from the central portion in the L direction is divided into nine regions as illustrated in FIG. 4, and the dimension of the dielectric layer 111 in the T direction is measured using an optical microscope image or an SEM image for respective corresponding regions, thereby obtaining an arithmetic mean of the measured values. For example, the SEM imaging conditions may include an acceleration voltage of 2 kV, a working distance of 3 mm, an aperture size of 30 μm, and a magnification of 30,000. In this case, the nine regions may be equally spaced in the width direction W and the thickness direction T, as illustrated in FIG. 4, but the present disclosure is not limited thereto. In addition, each of the nine regions may have a size including two internal electrode layers 121 and 122 and one dielectric layer 111 as illustrated in FIG. 4, but the configuration is not limited thereto. As another example, each of the nine regions may be sized to include eight internal electrode layers 121 and 122 and seven dielectric layers 111. The average thickness of the internal electrode layers 121 and 122 may also be obtained by the same method as the above-described method for measuring the average thickness of the dielectric layer 111.

Each of the dielectric layer 111 and the internal electrode layers 121 and 122 may have a relative standard deviation of thickness of 20% or less. When the relative standard deviation of the respective thicknesses of the dielectric layer 111 and the internal electrode layers 121 and 122 is 20% or less, electrode aggregation of the internal electrode layers 121 and 122 may be reduced, and thus, the properties of the component may be improved. In this case, the relative standard deviation of the thickness of the dielectric layer 111 may be obtained by obtaining the dimension of the dielectric layer 111 in the T direction for each of the nine regions by the method described above, by obtaining an arithmetic average of the obtained dimension values to obtain the average thickness, by calculating the standard deviation of the dimensions, by dividing the standard deviation by the average thickness and being multiplied by 100. The relative standard deviation of the thicknesses of the internal electrode layers 121 and 122 may also be calculated in the same manner as the above-described method of calculating the relative standard deviation of the thickness of the dielectric layer 111.

The cover portion 110C may be formed of a material similar to that of the dielectric layer 111 of the active portion 110A except that it does not include an internal electrode layer. In detail, the cover portion 110C may be formed using a ceramic dielectric powder, which is a material different from that of the dielectric layer 111. In this case, that the cover portion 110C is formed using a ceramic dielectric powder of a material different from that of the dielectric layer 111 may indicate that the dielectric powder used for forming the cover portion 110C and the dielectric powder for forming the dielectric layer 111 are composed of the same elements but have different ratios, may indicate that the types of elements of the aforementioned subcomponents are different, and may also indicate that the content of elements of the aforementioned subcomponents is different. On the other hand, as will be described later, the cover portion 110C includes magnesium (Mg).

The cover portion 110C may be formed by stacking a single dielectric layer or two or more dielectric layers on the upper and lower surfaces of the active portion 110A in the T direction, respectively, and may basically serve as protecting the first and second internal electrode layers 121 and 122 from being damaged by physical or chemical stress.

The side margin portion 110M may be formed of a material similar to that of the dielectric layer 111 of the active portion 110A except that it does not include an internal electrode layer. In detail, the side margin portion 110M may be formed using a ceramic dielectric powder, which is a material different from that of the dielectric layer 111. In this case, that the side margin portion 110M is formed using a ceramic dielectric powder of a material different from that of the dielectric layer 111 may indicate that a dielectric powder used for forming the side margin portion 110M and a dielectric powder for forming the dielectric layer 111 are composed of the same elements, but have different ratios therebetween, may indicate that the types of elements of the aforementioned subcomponents are different, and may also indicate that the contents of elements of the aforementioned subcomponents are different. On the other hand, as will be described later, the side margin portion 110M includes magnesium (Mg).

The side margin portion 110M may be formed by stacking in the width direction W a single dielectric layer or two or more dielectric layers on both side surfaces of the active portion 110A opposing in the width direction W, respectively, and may basically serve to prevent damage to the first and second internal electrode layers 121 and 122 due to physical or chemical stress.

For example, when the content of magnesium (Mg) included in the active portion 110A is A1, the content of magnesium (Mg) included in the cover portion 110C is C1, and the content of magnesium (Mg) included in the margin portion 110M is M1, $0<A1<M1 \leq C1$ and $A1/C1 \leq 0.60$ are satisfied. If A1 is greater than M1 or C1, or if the ratio of A1/C1 exceeds 0.60, the moisture resistance may be deteriorated.

The content A1 of magnesium included in the active portion 110A may be obtained by performing TEM-EDS mapping (or SEM-EDS mapping) on a plurality of points of the dielectric layer 111 of the active portion 110A in a cross-section in the width-thickness direction (W-T cross-section), taken from the center of the capacitor component 100 in the longitudinal direction L, by obtaining the contents of magnesium (Mg) for respective points, and by performing arithmetic mean thereon. In this case, the plurality of points may indicate at least three or more points, and may be spaced apart from each other at equal intervals, but the scope of the present disclosure is not limited thereto. Each of the magnesium (Mg) content C1 included in the cover portion 110C and the magnesium (Mg) content M1 included in the margin portion 110M may be measured in the same manner as the A1 measuring method described above.

Assuming that the porosity of the active portion 110A is A2, the porosity of the cover portion 110C is C2, and the porosity of the margin portion 110M is M2, A2 may be 0.01% or less. In addition, $A2/C2 \geq 0.003$ and $M2/C2 \geq 0.24$ may be satisfied. If A2 exceeds 0.01%, the moisture resistance may be deteriorated. If the ratio of A2/C2 exceeds 0.003 or the ratio of M2/C2 is less than 0.24, the moisture resistance may also deteriorate.

The porosity A2 of the active portion 110A may be obtained by calculating the area of respective pores on a plurality of regions of the dielectric layer 111 of the active portion 110A in a cross-section in the width-thickness direction (WT cross-section) taken from the center of the capacitor component 100 in the longitudinal direction L. In the corresponding region, the area for each pore and non-pore may be obtained, for example, by acquiring an optical microscope image or SEM image of the cross section and distinguishing pores and non-pores from each other in the image using an Object Area Tool. The porosity A2 may be obtained as a ratio of the total area of the pores to the total area of the region. In this case, the plurality of regions may be spaced apart from each other at equal intervals and may be selected to have the same area as each other, but the scope of the present disclosure is not limited thereto. For example, the SEM imaging conditions may include an acceleration voltage of 2 kV, a working distance of 3 mm, an aperture size of 30 μm, and a magnification of 12,000. Each of the porosity C2 of the cover portion 110C and the porosity M2 of the margin portion 110M may also be measured by the same method as the A2 measuring method described above.

Table 1 below illustrates changes in magnesium (Mg) content A1 (wt %) included in the active portion 110A of the product after sintering, magnesium (Mg) content C1 (wt %) included in the cover portion 110C thereof, and magnesium (Mg) content M1 (wt %) included in the margin portion 110M thereof, by changing the content (mol) of magnesium (Mg) included in the dielectric composition for forming the active portion 110A, the content (mol) of magnesium (Mg) included in the dielectric composition for forming the cover portion 110C, and the content (mol) of magnesium (Mg) included in the dielectric composition for forming the margin portion 110M. In addition, the porosity A2 (%) of the active portion 110A, the porosity C1 (%) of the cover portion 110C, and the porosity M2 (%) of the margin portion 110M of the product after sintering are illustrated.

Moisture resistance reliability evaluation (8585), for 400 samples per each experimental example, was performed under experimental conditions of temperature 85° C., relative humidity 85%, and applied voltage of 6.3V, by measuring the change in insulation resistance (IR) over time (t) (e.g., 1 hour). Samples in which insulation resistance decreased by 2 orders or more ($10^2$ or more) compared to the initial insulation resistance during the experiment time were determined to be defective, and the number of defective samples for each experimental example was counted and is illustrated in Table 1.

TABLE 1

| | | #1 | #2 | #3 | #4 |
|---|---|---|---|---|---|
| Mg content (dielectric composition) | For formation of active portion (mol) | 0.5 | 0.5 | 0.5 | 0.5 |
| | For formation of cover (mol) | 1 | 1 | 1.25 | 1.5 |
| | For formation of margin portion (mol) | 1 | 1.25 | 1.25 | 1 |
| Mg content (sintered body) | A1 (wt %) | 0.08 | 0.08 | 0.08 | 0.08 |
| | C1 (wt %) | 0.12 | 0.12 | 0.13 | 0.14 |
| | M1 (wt %) | 0.12 | 0.13 | 0.13 | 0.12 |
| Porosity | A2 (%) | 0.01 | 0.01 | 0.01 | 0.01 |
| | C2 (%) | 6.6 | 3.8 | 3.3 | 0.95 |
| | M2 (%) | 1.1 | 0.7 | 0.8 | 0.9 |
| | A1/C1 | 0.70 | 0.70 | 0.60 | 0.60 |
| | A2/C2 | 0.0015 | 0.0026 | 0.0030 | 0.0105 |
| | M2/C2 | 0.17 | 0.18 | 0.24 | 0.95 |
| | 8585 | 1/400 | 1/400 | 0/400 | 0/400 |

Referring to Table 1, in the case of Experimental Example 1, it can be seen that the porosity C2 of the cover portion 110C is 6.6%, the porosity M2 of the margin portion 110M is 1.1%, and the porosity A2 of the active portion 110A is 0.01%. In the case of Experimental Example 1, A1/C1 is 0.70 and exceeds 0.60, and A2/C2 is 0.0015 and has a value less than 0.003. In addition, M2/C2 is 0.17 and has a value less than 0.24. As a result, it can be seen that defects may occur in the evaluation of the moisture resistance reliability.

In the case of Experimental Example 2, it can be seen that the porosity C2 of the cover portion 110C is 3.8%, the porosity M2 of the margin portion 110M is 0.7%, and the porosity A2 of the active portion 110A is 0.01%. In the case of Experimental Example 2, A1/C1 is 0.70 and exceeds 0.60, and A2/C2 is 0.0026 and has a value less than 0.003. In addition, M2/C2 is 0.18 and has a value less than 0.24. As a result, it can be seen that defects occur in the evaluation of moisture resistance reliability.

In the case of Experimental Example 3, it can be seen that the porosity C2 of the cover portion 110C is 3.3%, the porosity M2 of the margin portion 110M is 0.8%, and the porosity A2 of the active portion 110A is 0.01%. In the case of Experimental Example 3, A1/C1 is 0.60, A2/C2 is 0.0030, and M2/C2 is 0.24. As a result, it can be seen that no defects occur in the evaluation of the moisture resistance reliability.

In the case of Experimental Example 4, it can be seen that the porosity C2 of the cover portion 110C is 0.95%, the porosity M2 of the margin portion 110M is 0.9%, and the porosity A2 of the active portion 110A is 0.01%. In the case of Experimental Example 4, A1/C1 is 0.60, A2/C2 is 0.0105, which is 0.003 or more, and M2/C2 is 0.95, which is 0.24 or more. As a result, it can be seen that no defects occur in the evaluation of the moisture resistance reliability.

The external electrodes 130 and 140 are disposed on the third and fourth surfaces 3 and 4 of the body 100 and are connected to the internal electrode layers 121 and 122. In detail, the first external electrode 130 is disposed on the third surface 3 of the body 110 and is connected to the first internal electrode layer 121 exposed to the third surface 3 of the body 110. The second external electrode 140 is disposed on the fourth surface 4 of the body 110 and is connected to the second internal electrode layer 122 exposed to the fourth surface 4 of the body 110. The first and second external electrodes 130 and 140 may include first electrode layers 131 and 141 and second electrode layers 132 and 142 disposed on the first electrode layers 131 and 141, respectively. On the other hand, the first and second external electrodes 130 and 140 differ from each other only in a connection relationship with the internal electrode layers 121 and 122 and a position formed on the body 110. Therefore, hereinafter, for convenience of descriptions, the first external electrode 130 disposed on the third surface 3 of the body 110 will be mainly described, and the description of the second external electrode 140 will be omitted. A description of the first external electrode 130 to be described later may be equally applied to the second external electrode 140.

The first electrode layer 131 respectively contact and are directly connected to the first internal electrode layers 121 exposed through the third surface 3 of the body 110, thereby securing electrical conduction between the first external electrode 130 and the first internal electrode layers 121. The first electrode layer 131 may be formed by applying a conductive paste including a conductive powder including at least one of copper (Cu) and silver (Ag) and then curing or sintering the conductive paste. As another example, the first electrode layer 131 may be a copper (Cu) plating layer.

The second electrode layer 132 is disposed on the first electrode layer 131. As a non-limiting example, the second electrode layer 132 may be a plating layer formed by electroplating. The second electrode layer 132 may have a structure in which, for example, a nickel plating layer and a tin plating layer are sequentially stacked.

The first external electrode 130 may include a connection portion formed on the third surface 3 of the body, and a band portion extending to at least a portion of each of the first surface 1, the second surface 2, the fifth surface 5 and the sixth surface 6 of the body 110 from the connection portion. However, the scope of the present disclosure is not limited by the present embodiment, and the first external electrode 130 may be variously modified into, for example, an L shape, a C shape, and the like.

As set forth above, according to an embodiment, the reliability of the capacitor component may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A capacitor component comprising:
   a body including a dielectric layer and first and second internal electrode layers; and
   external electrodes disposed on the body and connected to the first and second internal electrode layers, respectively,
   wherein the body includes an active portion in which the first and second internal electrode layers are alternately disposed with the dielectric layer interposed therebetween, a cover portion disposed on an upper portion and a lower portion of the active portion, and a side margin portion disposed on both sides of the active portion opposing each other,
   when a content of magnesium (Mg) included in the active portion is A1, a content of magnesium (Mg) included in the cover portion is C1, and a content of magnesium (Mg) included in the side margin portion is M1, $0<A1<M1\leq C1$ and $A1/C1\leq 0.60$ are satisfied, and
   when a porosity of the active portion is A2, a porosity of the cover portion is C2, and a porosity of the side margin portion is M2, $A2<M2<C2$ is satisfied.

2. The capacitor component of claim 1, wherein an average thickness of the dielectric layer is 400 nm or less.

3. The capacitor component of claim 2, wherein the dielectric layer has a relative standard deviation of thickness of 20% or less.

4. The capacitor component of claim 2, wherein an average thickness of the first internal electrode layer is 400 nm or less.

5. The capacitor component of claim 3, wherein the first internal electrode layer has a relative standard deviation of thickness of 20% or less.

6. The capacitor component of claim 1, wherein A2 is 0.01% or less.

7. The capacitor component of claim 1, wherein $A2/C2 \geq 0.003$ is satisfied.

8. The capacitor component of claim 1, wherein the external electrode comprises a first electrode layer disposed on the body, and a second electrode layer disposed on the first electrode layer.

9. The capacitor component of claim 8, wherein the second electrode layer comprises at least one of nickel (Ni) and tin (Sn).

10. The capacitor component of claim 1, wherein $M2/C2 \geq 0.24$ is satisfied.

11. A capacitor component comprising:
    a body including a dielectric layer and first and second internal electrode layers; and
    external electrodes disposed on the body and connected to the first and second internal electrode layers, respectively,
    wherein the body includes an active portion in which the first and second internal electrode layers are alternately disposed with the dielectric layer interposed therebetween, a cover portion disposed on an upper portion and a lower portion of the active portion, and a side margin portion disposed on opposing sides of the active portion,
    when a content of magnesium (Mg) included in the active portion is A1, a content of magnesium (Mg) included in the cover portion is C1, and a content of magnesium (Mg) included in the side margin portion is M1, $0<A1<M1\leq C1$ is satisfied, and
    when a porosity of the active portion is A2, a porosity of the cover portion is C2, and a porosity of the side margin portion is M2, $A2<M2<C2$ is satisfied.

12. The capacitor component of claim 11, wherein $A2/C2 \geq 0.003$ is satisfied.

13. The capacitor component of claim 11, wherein $M2/C2 \geq 0.24$ is satisfied.

14. The capacitor component of claim 11, wherein A2 is 0.01% or less.

15. The capacitor component of claim 11, wherein M2 is more than 0.01%.

16. The capacitor component of claim 11, wherein C2 is more than 0.01%.

* * * * *